(12) United States Patent
Namjoshi et al.

(10) Patent No.: US 10,366,159 B2
(45) Date of Patent: *Jul. 30, 2019

(54) ADDRESS PARSING SYSTEM

(71) Applicant: Workday, Inc., Pleasanton, CA (US)

(72) Inventors: Parag Avinash Namjoshi, Foster City, CA (US); Shuangshuang Jiang, San Francisco, CA (US); Mohammad Sabah, San Jose, CA (US)

(73) Assignee: Workday, Inc., Pleasanton, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/294,527

(22) Filed: Oct. 14, 2016

(65) Prior Publication Data

US 2017/0031895 A1    Feb. 2, 2017

Related U.S. Application Data

(63) Continuation of application No. 14/730,049, filed on Jun. 3, 2015, now Pat. No. 9,501,466.

(51) Int. Cl.
| | | |
|---|---|---|
| *G06F 17/27* | (2006.01) | |
| *G06F 21/57* | (2013.01) | |
| *G06Q 10/10* | (2012.01) | |
| *G06N 20/00* | (2019.01) | |
| *G06F 16/33* | (2019.01) | |
| *G06N 7/00* | (2006.01) | |

(52) U.S. Cl.
CPC ........ *G06F 17/277* (2013.01); *G06F 16/3332* (2019.01); *G06F 17/2705* (2013.01); *G06F 17/2765* (2013.01); *G06N 7/005* (2013.01); *G06N 20/00* (2019.01); *G06Q 10/105* (2013.01)

(58) Field of Classification Search
CPC ....... G06F 17/27; G06F 21/57; G06F 17/2715
USPC .................................................. 704/9, 240
See application file for complete search history.

(56) References Cited

U.S. PATENT DOCUMENTS

| | | | | |
|---|---|---|---|---|
| 2004/0243407 A1* | 12/2004 | Yu | ......... | G06F 17/278 704/240 |
| 2005/0234906 A1* | 10/2005 | Ganti | ............... | G06F 16/258 |
| 2006/0047500 A1* | 3/2006 | Humphreys | ......... | G06F 17/278 704/9 |
| 2006/0245641 A1* | 11/2006 | Viola | ................. | G06F 17/2715 382/155 |
| 2011/0035210 A1* | 2/2011 | Rosenfeld | ............ | G06F 17/278 704/9 |
| 2013/0204835 A1* | 8/2013 | Yao | ....................... | G06F 17/278 706/52 |
| 2015/0127324 A1* | 5/2015 | Mitchell | ............ | G06F 17/2705 704/9 |

(Continued)

*Primary Examiner* — Seong-Ah A Shin
(74) *Attorney, Agent, or Firm* — Van Pelt, Yi & James LLP

(57) ABSTRACT

A system for identifying address components includes an interface and a processor. The interface is to receive an address for parsing. The processor is to determine a matching model of a set of models based at least in part on a matching probability for each model for a tokenized address, which is based on the address for parsing, and associate each component of the tokenized address with an identifier based at least in part on the matching model, wherein each component of the set of components is associated with an identifier, and wherein probabilities of each component of the set of components are determined using training addresses.

20 Claims, 9 Drawing Sheets

(56) References Cited

U.S. PATENT DOCUMENTS

2015/0332049 A1* 11/2015 Chen .................... G06F 21/604
    726/22

* cited by examiner

ADDRESS PARSING SYSTEM

CROSS REFERENCE TO OTHER APPLICATIONS

This application is a continuation of U.S. patent application Ser. No. 14/730,049, now U.S. Pat. No. 9,501,466, entitled ADDRESS PARSING SYSTEM filed Jun. 3, 2015 which is incorporated herein by reference for all purposes.

BACKGROUND OF THE INVENTION

A human resources database system comprises data describing employees of a company (e.g., job data, job history data, job performance data, employee personal data, etc.). In the event the company desires to import data describing a set of employees from another system—for example, in the case of the company purchasing another company—the data needs to be transformed into a format the human resources system can handle. Employee address data presents a particular problem due to the large number of different ways an address can be formatted. Typical address parsing systems identify the specific fields within an address (e.g., city, state, street name, etc.) with poor accuracy.

BRIEF DESCRIPTION OF THE DRAWINGS

Various embodiments of the invention are disclosed in the following detailed description and the accompanying drawings.

DETAILED DESCRIPTION

Figure 1:
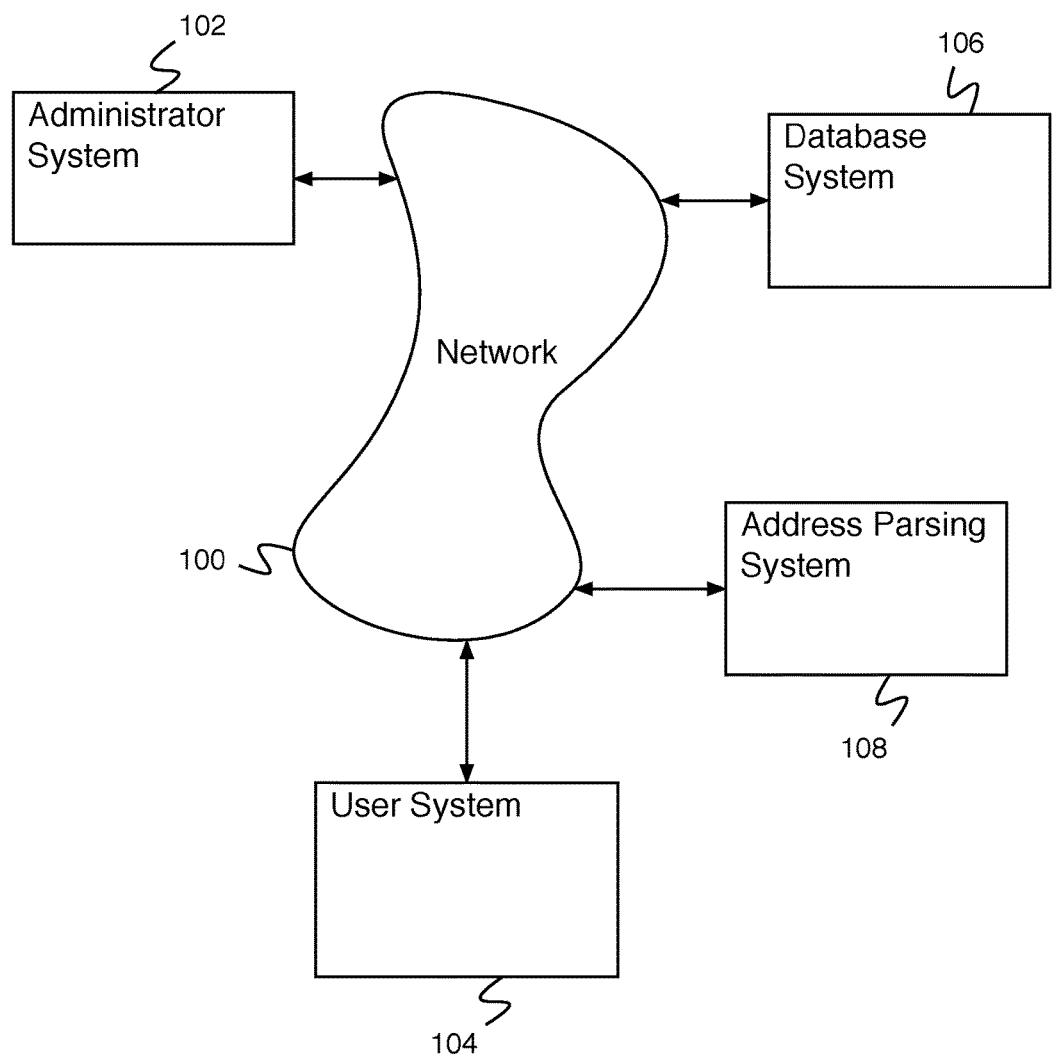
FIG. 1 is a block diagram illustrating an embodiment of a system for address parsing.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A system for identifying address components comprises a training address interface to receive training addresses, wherein training addresses are comprised of components with corresponding identifiers; a training address probability processor to determine probabilities of each component of the training address being associated with each identifier; a parsing address interface to receive an address for parsing; and a processor to: determine a matching model based at least in part on the matching probability for each model for a tokenized address, wherein the tokenized address is based at least in part on the address for parsing; and associate each component of the tokenized address with an identifier based at least in part on the matching model.

In some embodiments, a system for address parsing identifies address components by receiving a set of training addresses, wherein training addresses are comprised of components with corresponding identifiers. The components comprise the words of the address that need to be parsed, and the identifiers comprise the identifiers associated with the address as a result of parsing (e.g., the training addresses are already parsed). The training addresses are used to build a model database and a component probability database. The model database comprises a set of unique models, each model built from a training address. A model built from a training address comprises the ordered list of identifiers associated with the components of the training address. For example, an address "160 Spear Street, San Francisco, Calif. 94105, United States" could have an associated model "NUMBER, UNKNOWN, street, COMMA, san, francisco, COMMA, ca, POSTCODE, COMMA, united, states". In another example, the associated model is "ADDRESS-LINE_PARTS, MUNICIPALITY_PARTS, STATE_PARTS, POSTAL_CODE, COUNTRY_PARTS". "ADDRESS-LINE_PARTS" includes "NUMBER", "UNKNOWN_WORD", "street", "COMMA". "MUNICIPALITY_PARTS" includes "san", "francisco", and "COMMA". "STATE_PARTS" is "ca". "94105" and "COMMA" are interpreted as "POSTAL_CODE". "COUNTRY_PARTS" contains "united" and "states". Many models like this are possible for valid addresses, and each model maps to many possible addresses. The set of training addresses is ideally large enough to include a large fraction of possible address models. The component probability database is a database of probabilities that each component is associated with a given identifier. The probabilities are determined by measuring the fraction of occurrences of each component associated with each identifier. For example, the component "Broadway" is almost always associated with "ADDRESSLINE_PARTS", while the component "United" is most commonly associated with "COUNTRY_PARTS" but is also sometimes found to be associated with "MUNICIPALITY_PARTS" or with "ADDRESSLINE_PARTS". After the set of training addresses is processed to create the model database and the component probability database, the address parsing system is used to parse addresses. Addresses are first preprocessed (e.g., to remove extraneous characters) and tokenized (e.g., broken into an ordered list of tokens—for example, individual components). The set of tokens comprising the address is then compared with each model of the set of models to determine the model it fits best. A comparison of a tokenized address and a model is made by associating the ordered list of components of the tokenized address with the ordered list of identifiers of the model. In the event the list lengths are different, the probability that the address matches the model is zero. In the event the list lengths are the same, the probability that the address matches the model is determined by determining, for each position in the pair of lists, the probability that the associated token component (e.g., from the tokenized address) comprises the associated identifier (e.g., from the model). The matching probability is determined to be the product of the probabilities determined for each position. An address for parsing is compared with each address model in this way and the model with the highest probability is selected. The address is then parsed by associating each component of the address with the corresponding identifier of the model.

FIG. 1 is a block diagram illustrating an embodiment of a system for address parsing. In the example shown, FIG. 1 comprises network 100. In various embodiments, network 100 comprises one or more of the following: a local area network, a wide area network, a wired network, a wireless network, the Internet, an intranet, a storage area network, or any other appropriate communication network. Administrator system 102, user system 104, database system 106, and address parsing system 108 communicate via network 100. In some embodiments, administrator system 102 comprises a system for administrating a database system (e.g., database system 106). In various embodiments, administrating a database system comprises configuring a database system, updating a database system, running jobs on a database system, adding data to a database system, or any other appropriate database system operation. User system 104 comprises a client system for utilizing of database system 106. In various embodiments, the client system comprises 1, 2, 5, 10, 22, 122, or any other appropriate number of client systems. Database system 106 comprises a database system for maintaining a database. In some embodiments, database system 106 comprises a human resources database system. In some embodiments, database system 106 comprises a human resources database system for maintaining data on a user using user system 104. In some embodiments, when information describing a new user is added to database system 106, the address for the new user is parsed using address parsing system 108. In some embodiments, parsing an address comprises determining an identifier associated with each word of the address (e.g., postal code, country word, municipality word, street word, etc.). In some embodiments, address parsing system 108 first parses a set of training addresses and is then able to parse new addresses. In some embodiments, address parsing system 108 comprises part of database system 106. In some embodiments, address parsing system 108 comprises one or more processors and one or more memories (e.g., coupled to the processor and configured to provide the processor with instructions, data, etc.).

Figure 2:
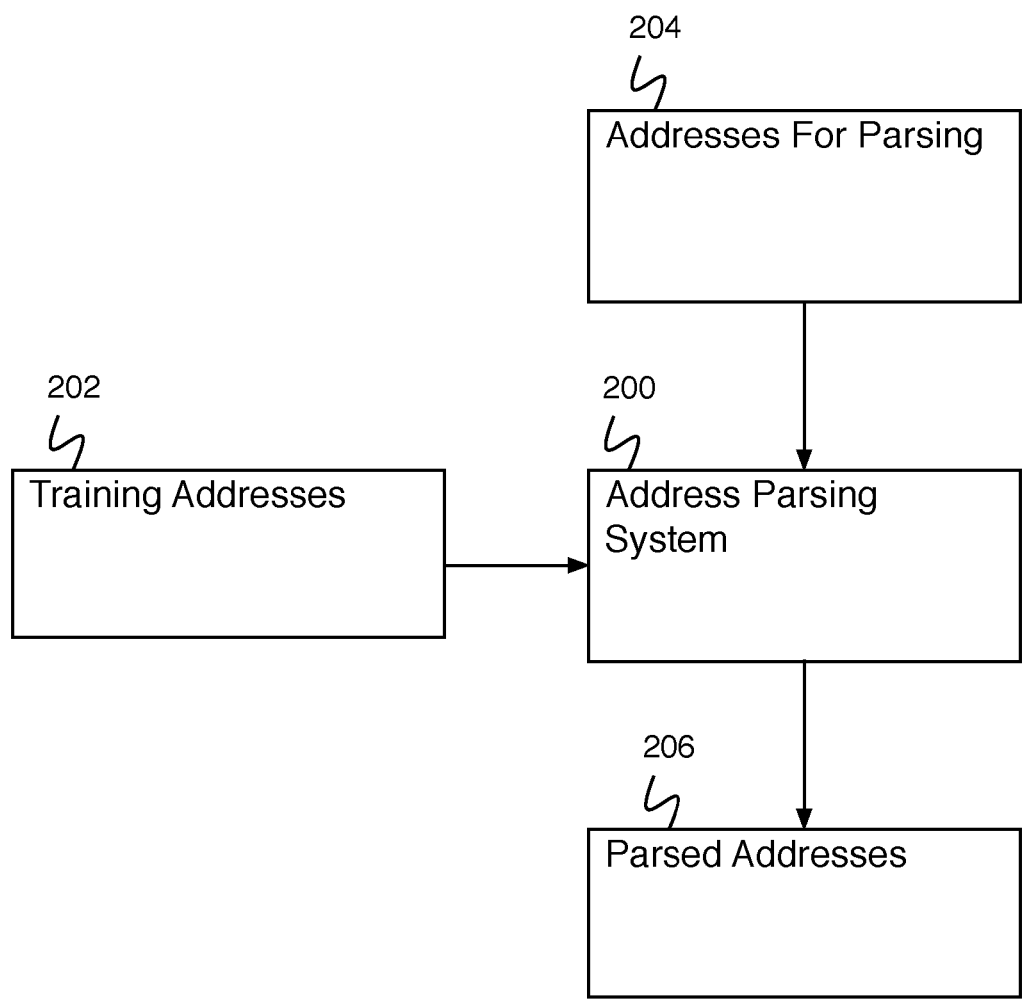
FIG. 2 is a block diagram illustrating an embodiment of addresses processed by an address parsing system.

FIG. 2 is a block diagram illustrating an embodiment of addresses processed by an address parsing system. In some embodiments, address parsing system 200 comprises address parsing system 108 of FIG. 1. In the example shown, address parsing system 200 receives training address 202. In various embodiments, training addresses 202 are received from an administrator system, a user system, from a human resources database system, from a database of training addresses or from any other appropriate source of training addresses. In some embodiments, training addresses 202 comprise addresses that have already been parsed. In some embodiments, training addresses 202 comprise addresses for training address parsing system 200 about the characteristics of correctly parsed addresses. Address parsing system 200 additionally receives addresses for parsing 204. In various embodiments, addresses for parsing 204 are received from an administrator system, a user system, from a human resources database system, from a database of addresses for parsing, or from any other appropriate source of addresses for parsing. In some embodiments, addresses for parsing 204 are received as a result of merging human resources database systems. Address parsing system 200 produces parsed addresses 206 comprising addresses for parsing 204 associated with parsing information.

Figure 3:
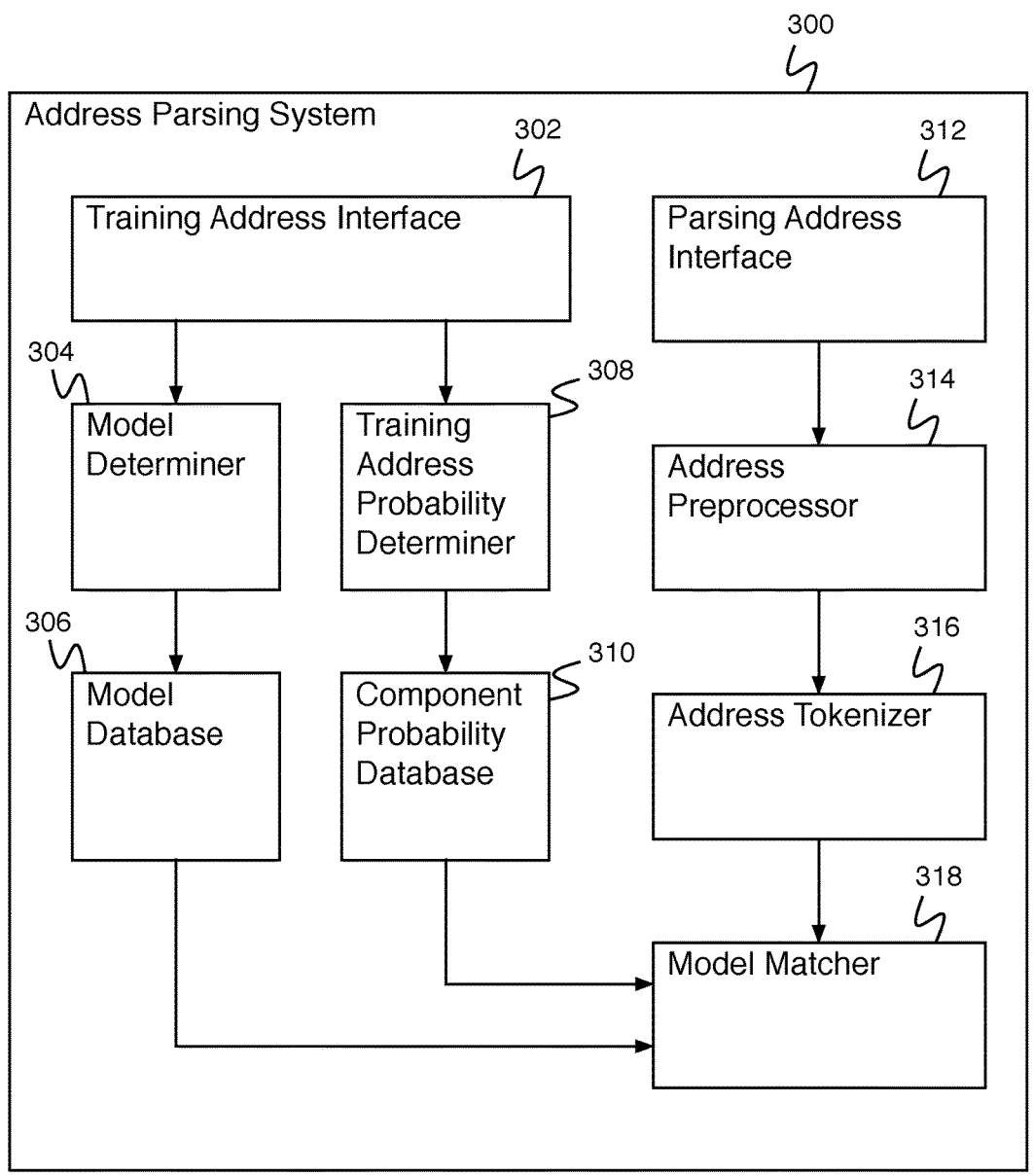
FIG. 3 is a block diagram illustrating an embodiment of an address parsing system.

FIG. 3 is a block diagram illustrating an embodiment of an address parsing system. In some embodiments, address parsing system 300 comprises address parsing system 108 of FIG. 1. In the example shown, address parsing system 300 comprises training address interface 302. In some embodiments, training address interface 302 comprises a training address interface for receiving training addresses. In some embodiments, training addresses comprise addresses associated with parsing information (e.g., an identifier associated with each word of the address). In some embodiments, training address interface is implemented using a processor. Training addresses received by training address interface 302 are provided to model determiner 304 and training address probability determiner 308. Model determiner 304 comprises a model determiner for determining a model from a training address. In some embodiments, a model is determined from the training address by determining the ordered set of identifiers associated with the training address. In some embodiments, model determiner 304 is implemented using a processor. Models determined by model determiner 304 are stored in model database 306. In some embodiments, model database 306 only stores unique copies of models (e.g., in the event model determiner 304 produces the same model for two training address received via training address interface 302, only one copy of the model is stored in model database 306). In some embodiments, model database 306 is implemented using a processor. Training address probability determiner 308 comprises a probability determiner for determining probabilities from training addresses. In some embodiments, probabilities comprise probabilities components are associated with identifiers. In some embodiments, probabilities comprise empirical rates components are associated with identifiers within training addresses received by training address interface 302. In some embodiments, training address probability determiner 308 is implemented using a processor. Probabilities determined by training address probability determiner 308 are stored within component probability database 310. In some embodiments, component probability database 310 is implemented using a processor. Address parsing system 300 additionally comprises parsing address interface 312. In some embodiments, parsing address interface 312 comprises an interface for receiving addresses for parsing. In some embodiments, parsing address interface 312 provides addresses for parsing to address preprocessor 314. In some embodiments, parsing address interface 312 is implemented using a processor. Address preprocessor 314 comprises an address preprocessor for preprocessing an address. In various embodiments, preprocessing an address comprises removing extra commas, extra spaces, extra hyphens, or any other appropriate extra characters, grouping words in parentheses, or preprocessing the address in any other appropriate way. In some embodiments, address preprocessor 314 provides a preprocessed address to address tokenizer 316. In some embodiments, address preprocessor 314 is implemented using a processor. Address tokenizer 316 comprises an address tokenizer for determining a tokenized address. In some embodiments, determining a tokenized address comprises breaking an address into tokens (e.g., individual words). In some embodiments, determining a tokenized address comprises determining a high-level representation of a token. In some embodiments, address tokenizer 316 provides a tokenized address to model matcher 318. In some embodiments, address tokenizer 316 is implemented using a processor. Model matcher 318 comprises a model matcher for matching a model (e.g., a model from model database 306) with a tokenized address (e.g., a tokenized address received from address tokenizer 316). In some embodiments, model matcher 318 determines the model with the highest probability of matching the tokenized address. In some embodiments, model matcher uses probabilities from component probability database 310 for determining the probability a tokenized address matches a model. In some embodiments, model matcher 318 associates identifiers from a matching model with components from a tokenized address. In some embodiments, model matcher 318 is implemented using a processor. In various embodiments, the elements of address parsing system 300 are implemented each on individual processors, combined onto a single processor, or combined onto multiple processors in any appropriate way.

Figure 4:
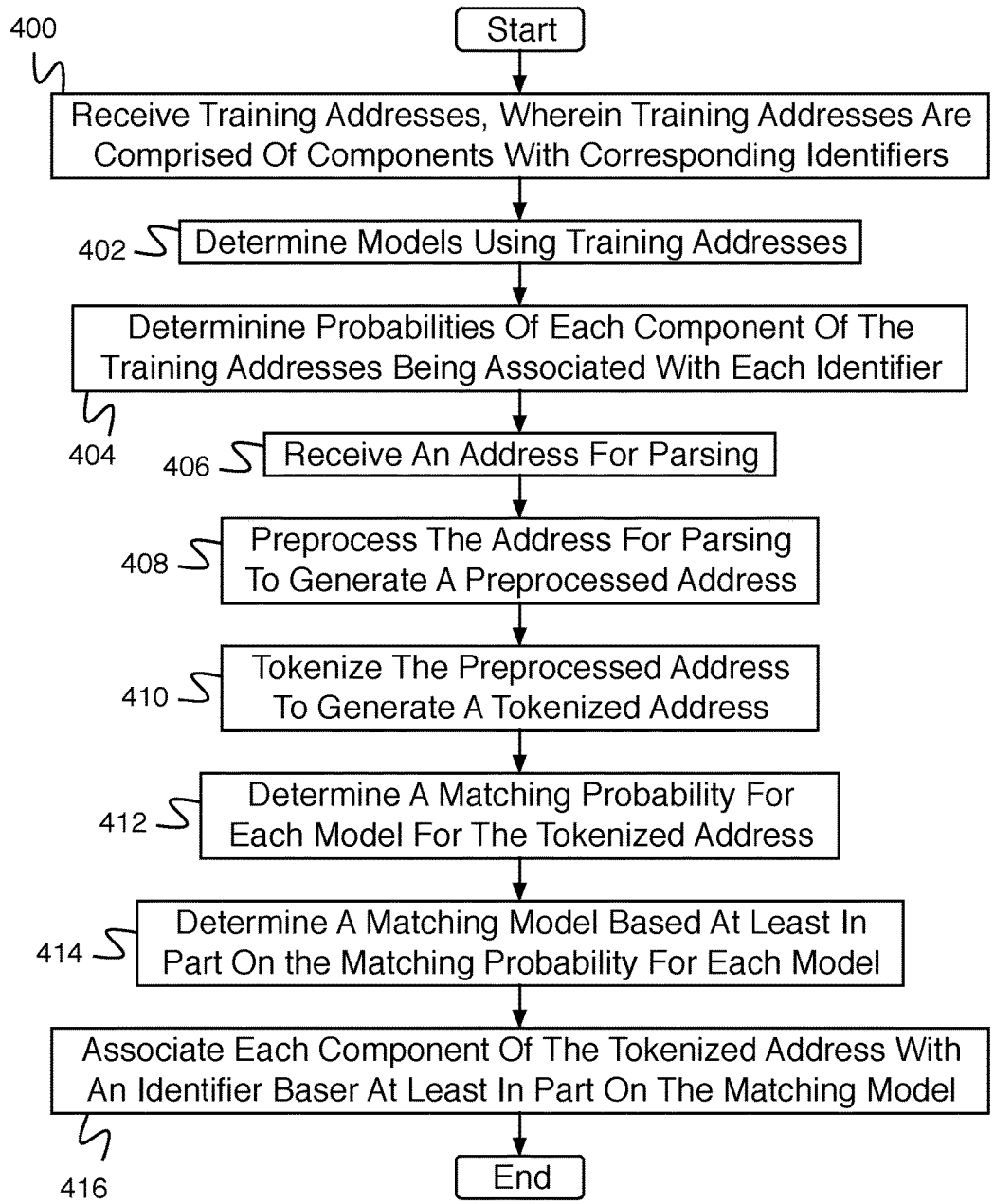
FIG. 4 is a flow diagram illustrating an embodiment of a process for parsing addresses.

FIG. 4 is a flow diagram illustrating an embodiment of a process for parsing addresses. In some embodiments, the process of FIG. 4 is executed by address parsing system 300 of FIG. 3. In the example shown, in 400, training addresses are received, wherein training addresses are comprised of components with corresponding identifiers. In some embodiments, training addresses are received via a training address interface. In some embodiments, training addresses comprise addresses that have already been parsed (e.g., that are known to be parsed correctly). In some embodiments, training addresses comprise addresses that have been parsed by hand. In some embodiments, training addresses are received from a library of training addresses. In 402, models are determined using training addresses. In some embodiments, models are determined using a model determiner. In some embodiments, models are stored in a model database. In some embodiments, only unique models are stored (e.g., in the event the same model is determined from two training addresses, the model is only stored once). In some embodiments, a model is determined from a training address by selecting an order of appearing identifiers associated with the training address without selecting the address information. In 404, the probabilities of each component of the training addresses being associated with each identifier are determined. In some embodiments, the probability that a component is associated with an identifier is determined to be zero in the event that the component is not associated with the identifier in any training address. In some embodiments, the probability that a component is associated with an identifier is determined to be the fraction of incidences of the component in the training addresses that are associated with the identifier. In some embodiments, the determined probabilities are stored. In 406, an address for parsing is received. In some embodiments, the address for parsing is received via a parsing address interface. In some embodiments, the parsing address interface and the training address interface comprise the same interface. In 408 the address for parsing is preprocessed to generate a preprocessed address. In some embodiments, the address for parsing is preprocessed using an address preprocessor. In various embodiments, preprocessing an address comprises removing extra commas, removing extra spaces, removing extra hyphens, removing any other appropriate characters, grouping words in parentheses, or preprocessing the address in any other appropriate way. In 410, the preprocessed address is tokenized to generate a tokenized address. In some embodiments, the preprocessed address is tokenized using an address tokenizer. In some embodiments, tokenizing the address comprises breaking the address into tokens (e.g., individual words). In some embodiments, tokenizing an address comprises determining a high-level representation of a token (e.g., determining a token comprises a known address word—for example, street, determining a token comprises a postal code, etc.). In 412, the matching probability for each model for the tokenized address is determined. In some embodiments, the matching probability for a model for the tokenized address is determined by determining the probability each component of the tokenized address comprises the associated identifier of the model. In some embodiments, a component of a tokenized address is associated with an identifier of a model when determining a matching probability in the event the component is at the same position in the tokenized address as the identifier in the model. In some embodiments, the matching probability for a model for the tokenized address comprises the product of the probabilities of each component of the tokenized address comprising the associated identifier of the model. In some embodiments, in the event there are a different number of tokens in the tokenized address from identifiers in a model, the probability that the tokenized address matches the model is determined to be zero. In 414, a matching model is determined based at least in part on the matching probability for each model. In some embodiments, the matching model is determined to be the model with the highest probability. In 416, each component of the tokenized address is associated with an identifier based at least in part on the matching model. In some embodiments, the set of components of the tokenized address and associated identifiers is provided. In some embodiments, the set of components of the tokenized address and associated identifiers is stored. In some embodiments, 412, 414, and 416 are performed by a model matcher. In some embodiments, instructions for the steps of the process of FIG. 4 are stored in a memory and provided for execution by a processor coupled to the memory. In various embodiments, the memory comprises a magnetic memory, a solid-state memory, an optical memory, or any other appropriate memory.

Figure 5:
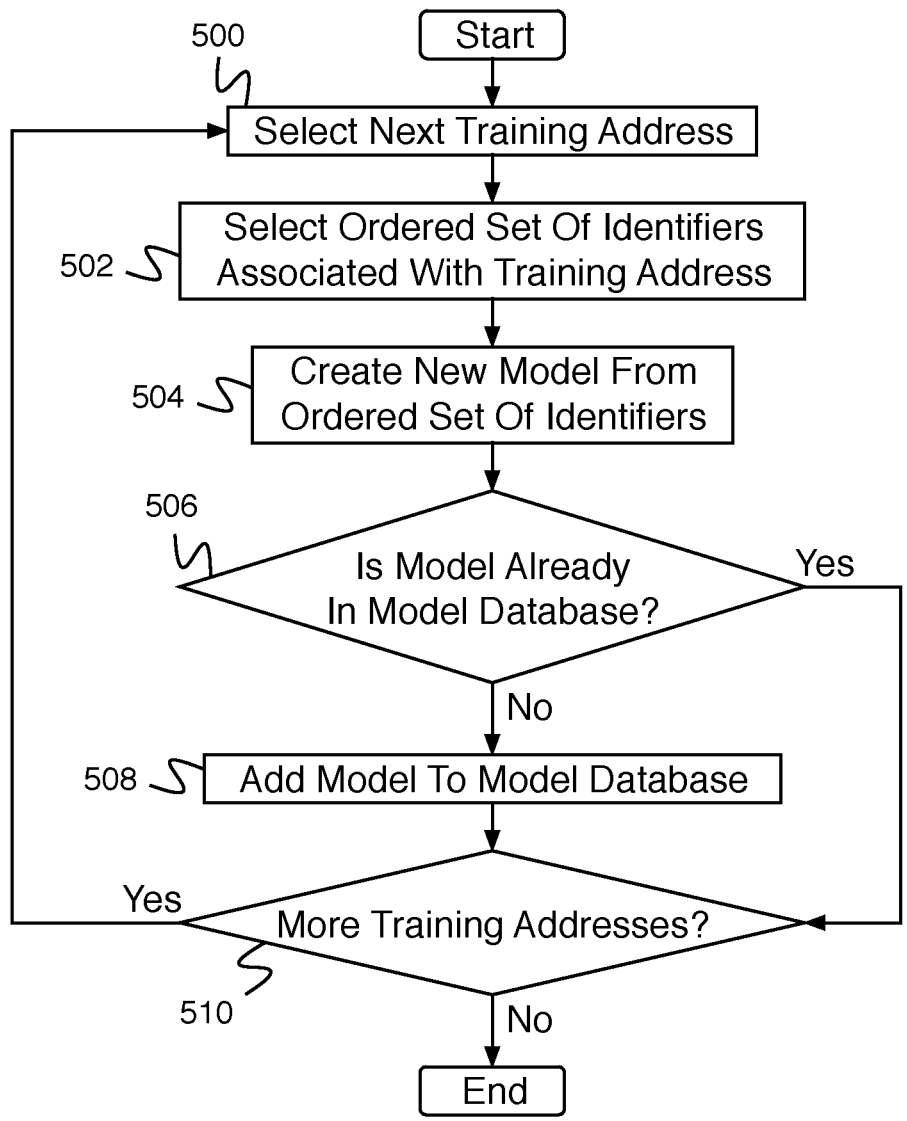
FIG. 5 is a flow diagram illustrating an embodiment of a process for determining models using training addresses.

FIG. 5 is a flow diagram illustrating an embodiment of a process for determining models using training addresses. In some embodiments, the process of FIG. 5 implements 402 of FIG. 4. In the example shown, in 500, the next training address is selected. In some embodiments, the next training address comprises the first training address. In 502, the ordered set of identifiers associated with the training address is selected (e.g., the ordered set of identifiers associated with each component of the parsed training address). In 504, a new model is created from the ordered set of identifiers (e.g., by designating the ordered set of identifiers as a model). In 506, it is determined whether the model is already in the model database. In the event it is determined that the model is already in the model database, control passes to 510. In the event it is determined that the model is not already in the model database, control passes to 508. In 508, the model is added to the model database. In 510, it is determined whether there are more training addresses. In the event it is determined that there are more training addresses, control passes to 500. In the event it is determined that there are not more training addresses, the process ends.

Figure 6:
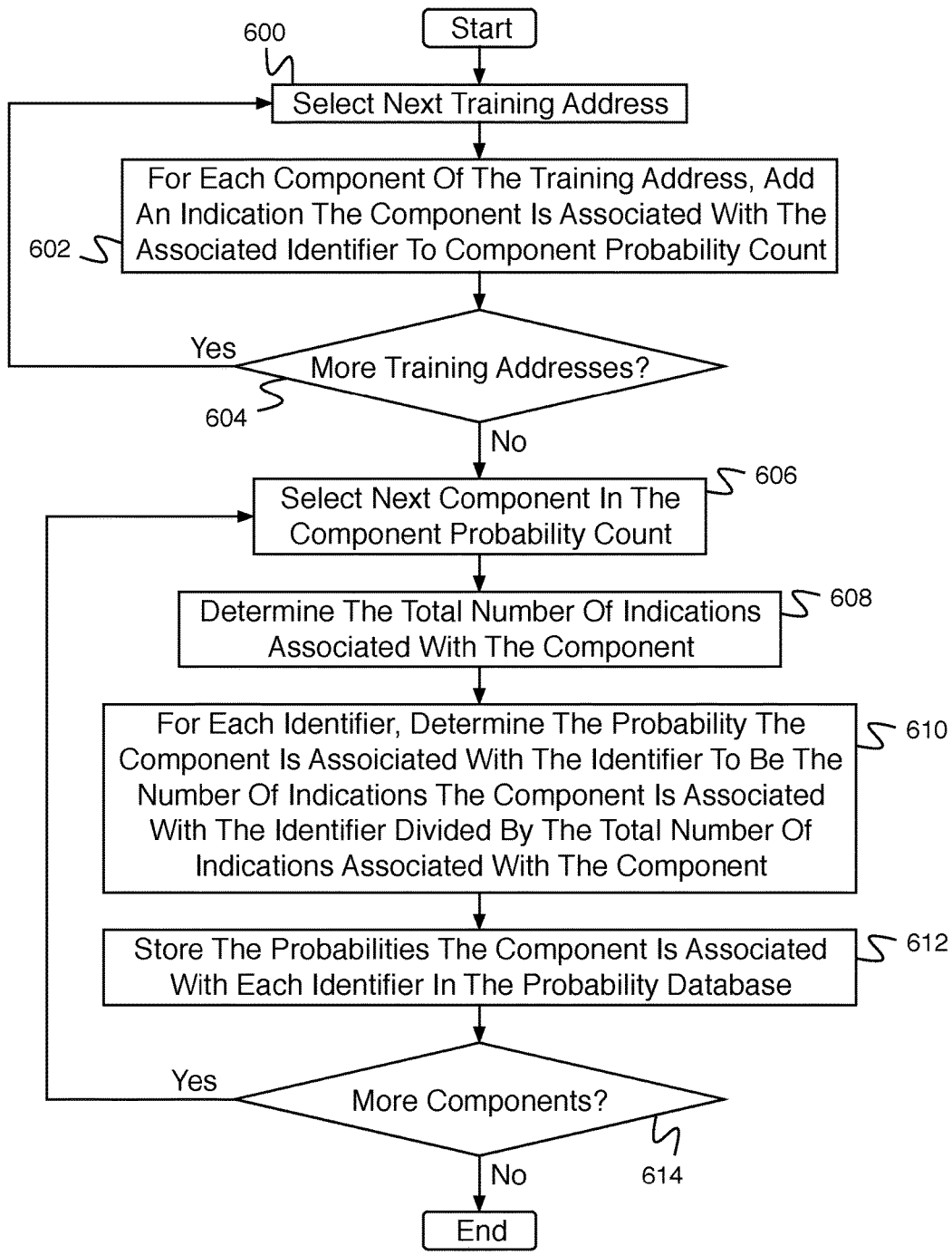
FIG. 6 is a flow diagram illustrating an embodiment of a process for determining the probabilities of each component being associated with each identifier.

FIG. 6 is a flow diagram illustrating an embodiment of a process for determining the probabilities of each component of the training address being associated with each identifier. In some embodiments, the process of FIG. 6 implements 404 of FIG. 4. In the example shown, in 600, the next training address is selected. In some embodiments, the next training address comprises the first training address. In 602, for each component of the training address, an indication that the component is associated with its associated identifier is added to the component probability count. A component probability count is maintained for each component for each associated identifier. The component probability count counts the total times that the component is seen associated with the associated identifier over the set of training addresses. In 604, it is determined whether there are more training addresses. In the event it is determined that there are more training addresses, control passes to 600. In the event it is determined that there are not more training addresses, control passes to 606. In 606, the next component in the component probability count is selected. In some embodiments, the next component comprises the first component. In 608, the total number of indications associated with the component is determined. In some embodiments, the total number of indications associated with the component comprises the total number of occurrences of the component in the training addresses. In some embodiments, the total number of indications is determined by adding the number of indications associated with the component for all identifiers. In 610, for each identifier, the probability the component is associated with the identifier is determined to be the number of indications the component is associated with the identifier divided by the total number of indications associated with the component (e.g., the fraction of times that the component was seen associated with the identifier). In 612, the probabilities that the component is associated with each identifier are stored in the probability database. In 614, it is determined whether there are more components. In the event it is determined that there are more components, control passes to 606. In the event it is determined that there are not more components, the process ends.

Figure 7:
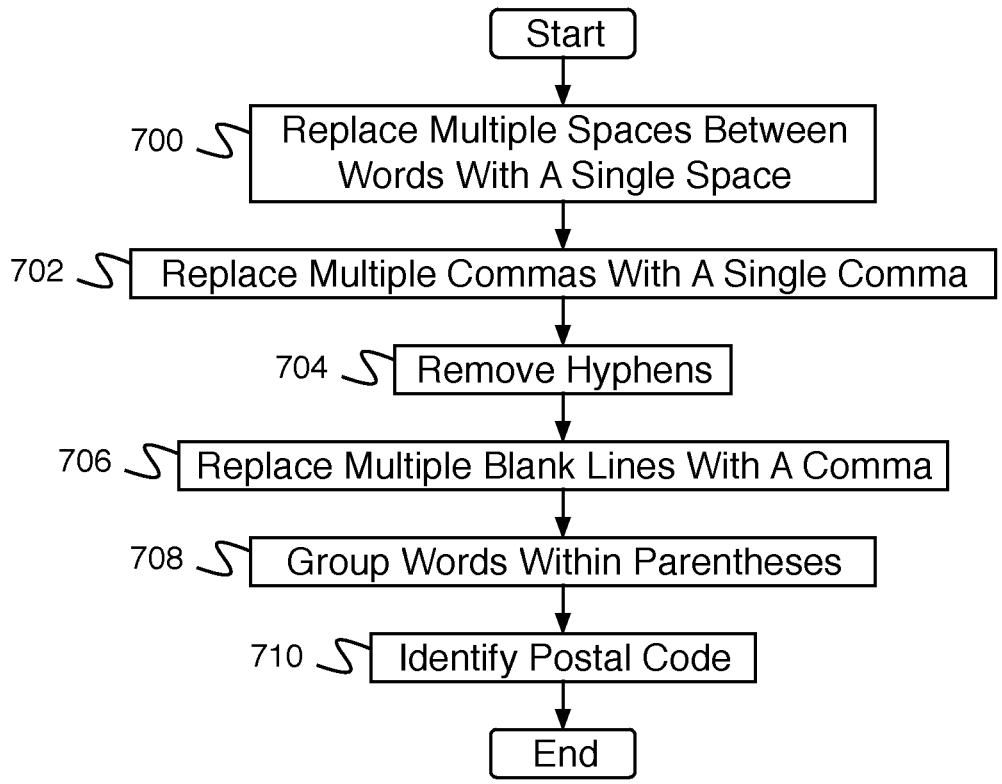
FIG. 7 is a flow diagram illustrating an embodiment of a process for preprocessing an address to generate a preprocessed address.

FIG. 7 is a flow diagram illustrating an embodiment of a process for preprocessing an address to generate a preprocessed address. In some embodiments, the process of FIG. 7 implements 408 of FIG. 4. In the example shown, in 700, multiple spaces between words are replaced with a single space. In 702, multiple commas are replaced with a single comma. In 704, hyphens are removed. In 706, multiple blank lines are replaced with a comma. In 708, words within parentheses are grouped. In 710, a postal code is identified.

Figure 8:
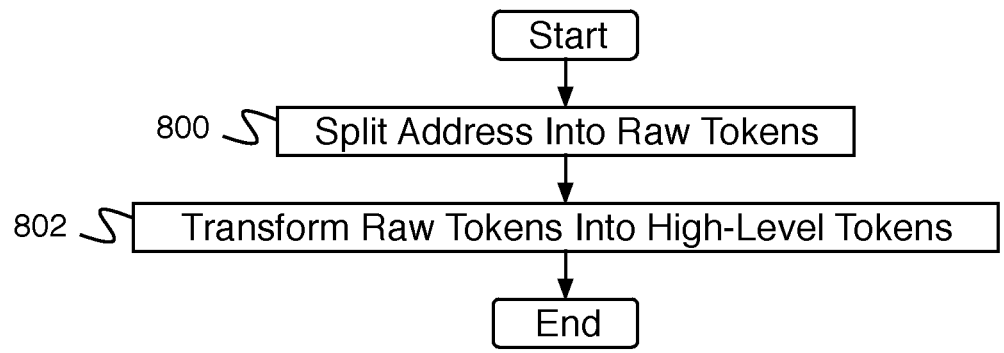
FIG. 8 is a flow diagram illustrating an embodiment of a process for tokenizing an address to generate a tokenized address.

FIG. 8 is a flow diagram illustrating an embodiment of a process for tokenizing an address to generate a tokenized address. In some embodiments, the process of FIG. 8 implements 410 of FIG. 4. In the example shown, in 800, the address is split into raw tokens. In some embodiments, raw tokens comprise words. In some embodiments, splitting the address into raw tokens comprises splitting the address at spaces. In 802, the raw tokens are transformed into high-level tokens. In various embodiments, transforming raw tokens into high-level tokens comprises identifying tokens as known direction words, identifying tokens as numbers, identifying tokens as unknown words, or identifying tokens as any other appropriate high-level tokens.

Figure 9:
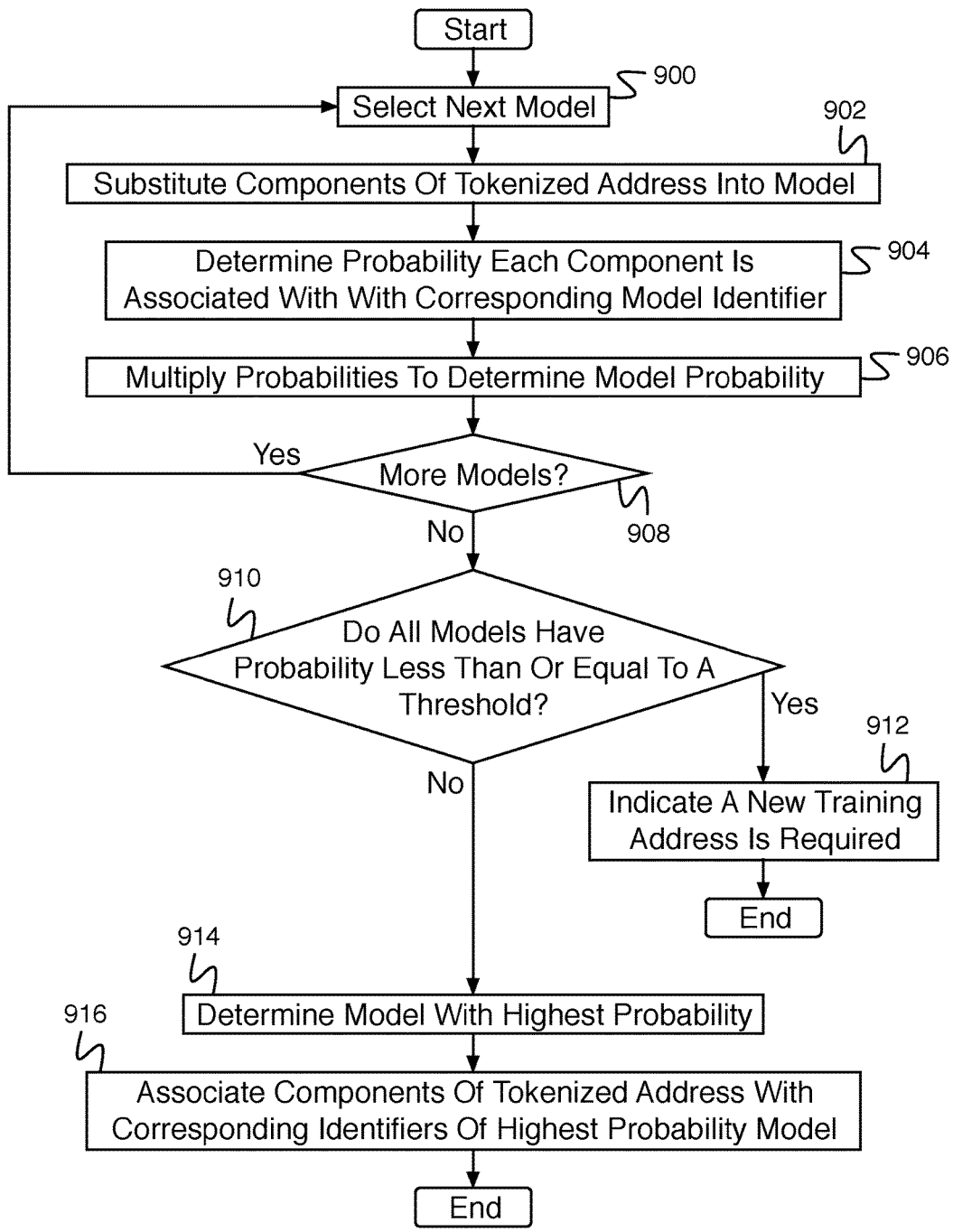
FIG. 9 is a flow diagram illustrating an embodiment of a process for a model matcher.

In some embodiments, an example of an address that is broken into tokens is as follows:
Address="650 W Shaw Ave Fresno, Calif. 93704"
"650": NUMBER
"W": DIRECTION
"Shaw": UNKNOWN
"Ave": STREET
"Fresno": fresno (note: it is a known word, and is identified as itself)
",": COMMA
"CA": ca
"93704": POSTCODE In some embodiments, an example of an address that is broken into tokens is as follows:
Address="Palladium Hall, 140 E 14th st, New York, N.Y. 10003"
"Palladium": UNKNOWN
"Hall": hall
",": COMMA
"140": NUMBER
"E": DIRECTION
"14th": ALPHANUMER
"st": STREET
",": COMMA
"New": new
"York": york
",": COMMA
"NY": ny
"10003": POSTCODE In some embodiments, an example of an address that is broken into tokens is as follows:
Address="2214 E Kansas Ave, Suite 17, Garden City Plaza, Garden City, Kans. 67846"
"2214": NUMBER
"E": DIRECTION
"Kansas": Kansas
"Ave": STREET
",": COMMA
"Suite": suite
"17": NUMBER
"Garden": garden
"City": city
"Plaza": STREET
",": COMMA
"Garden": garden
"City": city
",": COMMA
"KS": ks
"67846": POSTCODE FIG. 9 is a flow diagram illustrating an embodiment of a process for a model matcher. In various embodiments, the process of FIG. 9 implements one or more of 412, 414, and 416 of FIG. 4. In the example shown, in 900, the next model is selected. In some embodiments, the next model comprises the first model. In 902, the components of the tokenized address are substituted into the model. In some embodiments, substituting the components of the tokenized address into the model comprise associating each component of the tokenized address with the identifier at the corresponding position in the model (e.g., the first component of the tokenized address is associated with the first identifier in the model, the second component of the tokenized address is associated with the second identifier in the model, etc.). In 904, the probability each component is associated with the corresponding model identifier is determined. In some embodiments, the probability is determined by looking up the probability in a component probability database. In 906, the probabilities (e.g., the probabilities determined in 904) are multiplied to determine the model probability. In some embodiments, in the event the number of components in the tokenized address is different from the number of identifiers in the model, the model probability is determined to be zero. In 908, it is determined if there are more models. In the event it is determined that there are more models, control passes to 900. In the event it is determined that there are not more models, control passes to 910. In 910 it is determined whether all models have a probability less than or equal to a threshold. In some embodiments, the threshold is zero probability. In the event it is determined that all models do not have probability less than or equal to a threshold, control passes to 914. In the event it is determined that all models have probability less than equal to a threshold, control passes to 912. In some embodiments, all models having probability less than or equal to the threshold comprises the address for parsing not matching any models in the model database. In 912, an indication is made that a new training address is required, and the process ends. In some embodiments, the address for parsing is provided for parsing by hand. In some embodiments, the address for parsing, after parsing by hand, is added to the set of training addresses. In 914, the model with the highest probability is determined. In 916, the components of the tokenized address are associated with the corresponding identifiers of the highest probability model. In some embodiments, the set of components of the tokenized address and associated identifiers are provided (e.g., to a human resources database). In some embodiments, the set of components of the tokenized address and associated identifiers are stored.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for identifying address components, comprising:
   an interface configured to receive an address for parsing; and
   a processor configured to:
   determine a tokenized address based at least in part on the address for parsing, wherein the tokenized address comprises an ordered set of components having a component list length;
   determine a matching probability for each model of a set of models, each model of the set of models comprising an ordered set of identifiers having an identifier list length, wherein determining the matching probability comprises to:
   in response to determining that the component list length and an identifier list length of a model of the set of models are of equivalent length, determine, based at least in part on training addresses, a probability that a component of the ordered set of components is associated with a corresponding identifier of the model of the set of models;
   determine a matching model of the set of models based at least in part on the matching probability for each model of the set of models;
   associate each component of the ordered set of components with a corresponding identifier of the matching model; and
   store the ordered set of components and the corresponding identifiers of the matching model.

2. The system of claim 1, wherein the training addresses are used to determine the set of models.

3. The system of claim 2, wherein the model of the set of models determined using a training address of the training addresses comprises an order of identifiers associated with the training address.

4. The system of claim 1, wherein the model of the set of models is not identical to an other model of the set of models.

5. The system of claim 1, wherein the probability that the component of the ordered set of components is associated with the corresponding identifier of the model of the set of models is determined to be zero in response to the component not being associated with the corresponding identifier in any training address.

6. The system of claim 1, wherein the probability that the component of the ordered set of components is associated the corresponding identifier of the model of the set of models is determined to be a fraction of incidences of the component in the training addresses that are associated with the corresponding identifier.

7. The system of claim 1, wherein the processor is further configured to preprocess the address to generate a preprocessed address.

8. The system of claim 7, wherein preprocessing the address comprises removing extra spaces.

9. The system of claim 7, wherein preprocessing the address comprises removing extra commas.

10. The system of claim 7, wherein preprocessing the address comprises removing extra characters.

11. The system of claim 1, wherein the processor is further configured to tokenize the address for parsing to generate the tokenized address.

12. The system of claim 11, wherein tokenizing the address comprises breaking the address into tokens.

13. The system of claim 11, wherein tokenizing the address comprises determining a high-level representation of a token.

14. The system of claim 1, wherein the processor is further configured to indicate a new training address is required in response to no matching model being determined.

15. The system of claim 1, wherein the processor is further configured to provide the ordered set of components of the tokenized address and the associated corresponding identifiers of the matching model.

16. The system of claim 1, wherein determining the matching model comprises determining the model of the set of models with a highest matching probability.

17. The system of claim 1, wherein in response to determining that the component list length and the identifier list length of the model of the set of models are not of equivalent length, determine the matching probability of the model of the set of models is zero.

18. The system of claim 1, wherein the processor is further configured to determine probabilities of a component being associated with an identifier based at least in part on the training addresses.

19. A method for identifying address components, comprising:
- receiving an address for parsing;
- determining, using a processor, a tokenized address based at least in part on the address for parsing, wherein the tokenized address comprises an ordered set of components having a component list length;
- determining a matching probability for each model of a set of models, each model of the set of models comprising an ordered set of identifiers having an identifier list length, wherein determining the matching probability comprises:
  - in response to determining that the component list length is and an identifier list length of a model of the set of models are of equivalent length, determining, based at least in part on training addresses, a probability that a component of the ordered set of components is associated with a corresponding identifier of the first model of the set of models;
- determining a matching model of the set of models based at least in part on a matching probability for each model of the set of models;
- associating each component of the ordered set of components with a corresponding identifier of the matching model; and
- storing the ordered set of components and the corresponding identifiers of the matching model.

20. A computer program product for identifying address components, the computer program product being embodied in a non-transitory computer readable storage medium and comprising computer instructions for:
- receiving an address for parsing;
- determining, using a processor, a tokenized address based at least in part on the address for parsing, wherein the tokenized address comprises an ordered set of components having a component list length;
- determining a matching probability for each model of a set of models, each model of the set of models comprising an ordered set of identifiers having an identifier list length, wherein determining the matching probability comprises:
  - in response to determining that the component list length and an identifier list length of a model of the set of models are of equivalent length, determining, based at least in part on training addresses, a probability that a component of the ordered set of components is associated with a corresponding identifier of the model of the set of models;
- determining a matching model of the set of models based at least in part on a matching probability for each model of the set of models;
- associating each component of the ordered set of components with a corresponding identifier of the matching model; and
- storing the ordered set of components and the corresponding identifiers of the matching model.

* * * * *